US012165344B2

(12) United States Patent
Eguchi et al.

(10) Patent No.: US 12,165,344 B2
(45) Date of Patent: Dec. 10, 2024

(54) DISTANCE MEASUREMENT APPARATUS, DISTANCE DETECTION TECHNIQUE, AND IMAGING APPARATUS

(71) Applicant: CANON KABUSHIKI KAISHA, Tokyo (JP)

(72) Inventors: Yosuke Eguchi, Tokyo (JP); Takuya Ishibashi, Tokyo (JP); Satoru Komatsu, Melrose, MA (US)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 18/061,331

(22) Filed: Dec. 2, 2022

(65) Prior Publication Data

US 2023/0177711 A1   Jun. 8, 2023

(30) Foreign Application Priority Data

Dec. 6, 2021   (JP) ................. 2021-198019

(51) Int. Cl.
G06T 7/571      (2017.01)
G01K 1/02       (2021.01)
H04N 17/00      (2006.01)
H04N 23/65      (2023.01)

(52) U.S. Cl.
CPC .............. *G06T 7/571* (2017.01); *G01K 1/026* (2013.01); *H04N 17/002* (2013.01); *G06T 2207/10028* (2013.01); *H04N 23/651* (2023.01)

(58) Field of Classification Search
None
See application file for complete search history.

(56) References Cited

U.S. PATENT DOCUMENTS

| | | | | |
|---|---|---|---|---|
| 2014/0300800 A1* | 10/2014 | Sasaki | .................. | H04N 23/673 348/347 |
| 2020/0172101 A1* | 6/2020 | Shimizu | ............... | G05D 1/0223 |
| 2020/0404184 A1* | 12/2020 | Maeda | .................... | G01D 5/145 |
| 2021/0120194 A1* | 4/2021 | Ling | ........................ | G06T 7/80 |

FOREIGN PATENT DOCUMENTS

JP    2003248162 A    9/2003
JP    2011248181 A    12/2011

* cited by examiner

*Primary Examiner* — Eileen M Adams
(74) *Attorney, Agent, or Firm* — Canon U.S.A., Inc. IP Division

(57) ABSTRACT

A distance measurement apparatus includes one or more processors, and a memory storing instructions which, when executed by the one or more processors, cause the distance measurement apparatus to function as a calculation unit configured to calculate distance information corresponding to an image captured by an imaging apparatus using an image sensor that captures an object image focused on the image sensor via an optical system, a temperature information obtaining unit configured to obtain temperature information of the imaging apparatus at different times, and a distance correction unit configured to correct the distance information, wherein the distance correction unit corrects the distance information based on the temperature information at a time at which a first image capturing is performed and the temperature information at a time before the first image capturing is performed.

12 Claims, 11 Drawing Sheets

INTERVAL CHANGE DUE TO TEMPERATURE CHANGE

DEFOCUS SHIFT

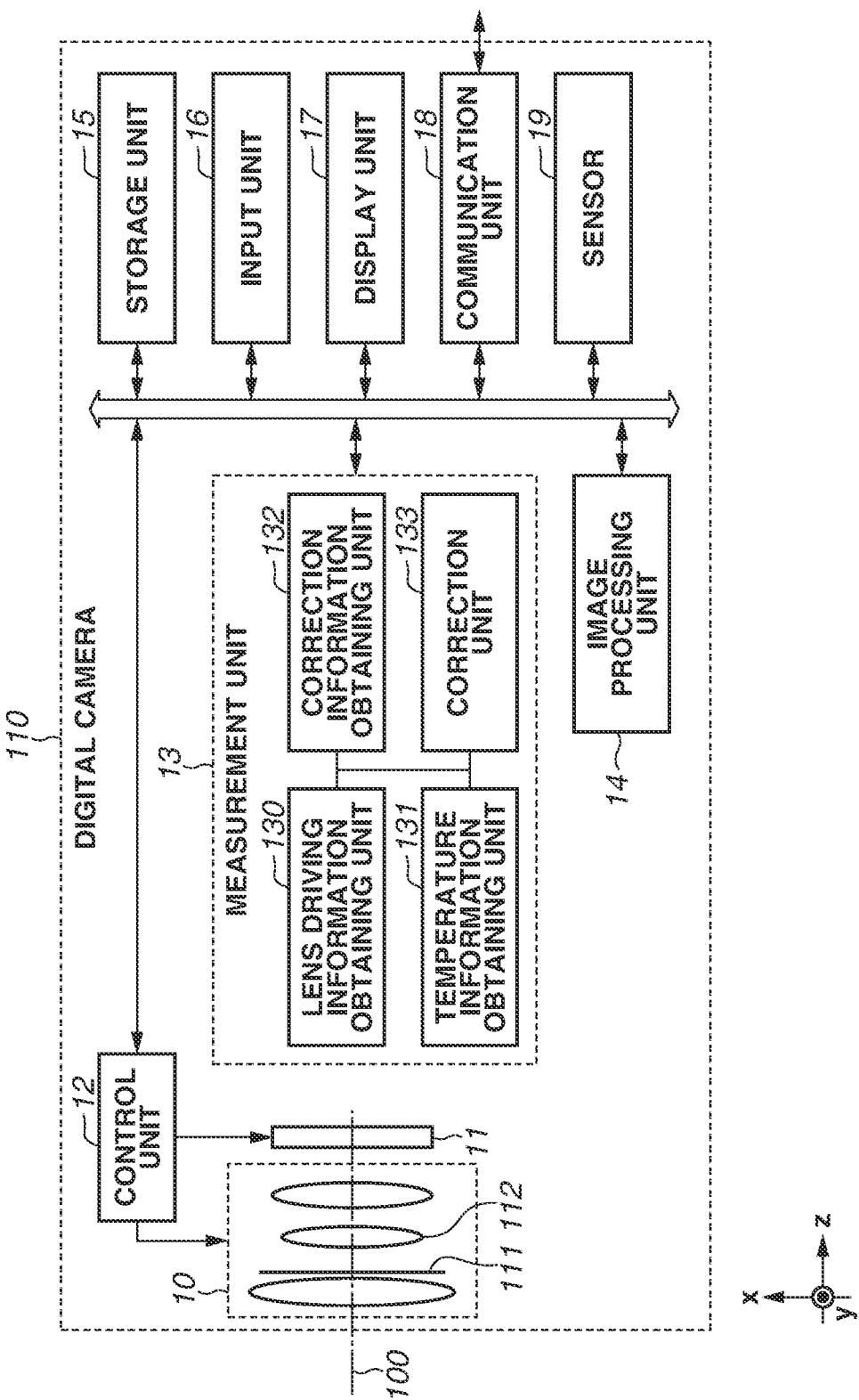

DISTANCE MEASUREMENT APPARATUS, DISTANCE DETECTION TECHNIQUE, AND IMAGING APPARATUS

BACKGROUND

Field of the Disclosure

The present disclosure relates to a distance measurement apparatus and a distance detection technique, and more specifically, relates to a distance measurement apparatus and a distance detection technique used for digital cameras.

Description of the Related Art

As a distance measurement apparatus and a distance detection technique applicable to a digital camera and other devices, a distance detection technique based on the phase difference system is known. With this method, a defocus amount or a distance to an object can be calculated based on a phase difference between images obtained from different viewpoints.

Recently, a technique for correcting a calculated object distance shifted due to the heat generated by the camera itself or the environmental temperature transmitting to a lens barrel and causing a shift of a defocus amount has been discussed. For example, Japanese Patent Application Laid-open No. 2003-248162 discusses a technique of performing a temperature correction of a distance based on a temperature of a thermometer and a temperature table provided in a lens barrel, to obtain an accurate object distance. On the other hand, Japanese Patent Application Laid-open No. 2011-248181 discusses a technique of performing focusing again by moving a focus lens in a predetermined direction, because there is a possibility that a focus position has shifted when the temperature changes by more than a predetermined value.

However, in a case where distance information that is changed due to the temperature is to be corrected by the method discussed in Japanese Patent Application Laid-open No. 2003-248162, it is not possible to appropriately correct the distance shift caused by the temperature in a state where the heat transmitted to the lens has not turned into a stationary state.

In addition, with the technique discussed in Japanese Patent Application Laid-open No. 2011-248181, since the defocus shift is corrected by the focus driving, it is not possible to correct the distance information.

SUMMARY

The present disclosure is directed to a technique capable of accurately calculating an object distance even in a case where a temperature change occurs depending on an imaging condition.

According to an aspect of the present disclosure, a distance measurement apparatus includes one or more processors, and a memory storing instructions which, when executed by the one or more processors, cause the distance measurement apparatus to function as a calculation unit configured to calculate distance information corresponding to an image captured by an imaging apparatus using an image sensor that captures an object image focused on the image sensor via an optical system, a temperature information obtaining unit configured to obtain temperature information of the imaging apparatus at different times, and a distance correction unit configured to correct the distance information, wherein the distance correction unit corrects the distance information based on the temperature information at a time at which a first image capturing is performed and the temperature information at a time before the first image capturing is performed.

Further features of the present disclosure will become apparent from the following description of exemplary embodiments with reference to the attached drawings.

BRIEF DESCRIPTION OF THE DRAWINGS

FIG. 6 is a block diagram illustrating a functional configuration of a digital camera that is an example of a distance measurement apparatus.

DESCRIPTION OF THE EMBODIMENTS

Exemplary embodiments of the present disclosure will be described in detail with reference to the attached drawings. In addition, the exemplary embodiments are not intended to limit the present disclosure according the range of the claims. In the exemplary embodiments, a plurality of features is described, but not all the features are necessarily essential, and the plurality of features may be combined arbitrarily. Further, in the attached drawings, the same or similar components are assigned the same reference numbers, and the redundant descriptions thereof are omitted.

<Basic Flow of Distance Measurement>

Figure 1:
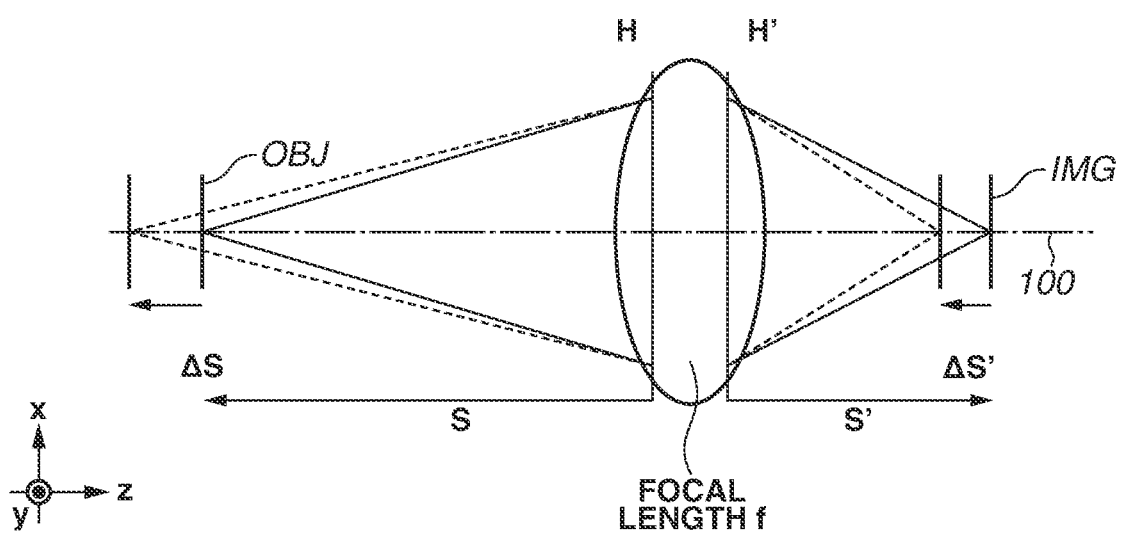
FIG. 1 is a diagram illustrating a principle of the present disclosure.

FIG. 1 illustrates an image formation relationship by a lens regarding a principle of the present disclosure.

In the present disclosure, a direction parallel to an optical axis is defined as a z-direction or defocus direction, a direction orthogonal to the optical axis and parallel to a horizontal direction of an imaging plane is defined as an x-direction, and a direction orthogonal to the optical axis and parallel to a vertical direction of the imaging plane is defined as a y-direction, or, an axis is set for each of the directions.

In the present disclosure, a parallax amount is obtained from images focused through an imaging optical system using an imaging plane phase difference distance measurement method or a Depth from Defocus (DFD) method, and the parallax amount is converted into a defocus amount. In this way, the distance measurement is performed to obtain object distance information. In this case, examples of the factors of the defocus amount shift described above include an optical arrangement change caused by extensions of a lens barrel and a flange back, and changes of a glass thickness, a lens interval, a lens refractive index, and a lens curvature. The present disclosure is characterized in that the defocus amount shift is corrected.

In FIG. 1, "OBJ" indicates an object surface, "IMG" indicates an image plane, "H" indicates a front principal point, "H'" indicates a rear principal point, "f" indicates a focal length of the lens, "S" indicates a distance from the object surface to the front principal point, and "S'" indicates a distance from the rear principal point to the image plane. "ΔS" indicates a defocus amount, and "ΔS" indicates a relative distance of the object side depending on the defocus amount. A dashed-dotted line indicates an optical axis 100, solid lines indicates an image-forming light flux, and broken lines indicates a defocus light flux.

It is known that an equation (1) holds in an image formation by a lens.

$$\frac{1}{S} + \frac{1}{S'} = \frac{1}{f} \qquad (1)$$

An equation (2) obtained by transforming the equation (1) obviously holds at the time of defocusing.

$$\frac{1}{S + \Delta S} + \frac{1}{S' + \Delta S'} = \frac{1}{f} \qquad (2)$$

Because "S" and "f", which are read out from image capturing information such as a lens state, are known, "S'" is obtained from the equation (1), and the "ΔS'" is obtained from the equation (2) using "ΔS" obtained by the above-described imaging plane phase difference distance measurement method or DFD method.

As described above, based on the simultaneous equations (1) and (2), object distance information can be generated using the image capturing information and the defocus amount. Because the defocus amount can be obtained for a part of or whole area of the screen, the object distance information corresponding to an area for which the defocus amount is calculated can be obtained.

<Distance Measurement Error due to Defocus Shift caused by Temperature>

The distance measurement error in the distance measurement caused by temperature will be described with reference to FIGS. 2A and 2B.

An error occurs due to the defocus shift of the imaging optical system in a case where the distance measurement method of performing the distance measurement using the images focused through the imaging optical system, such as the imaging plane phase difference distance measurement method or the DFD method described above, is used.

Figure 2A:
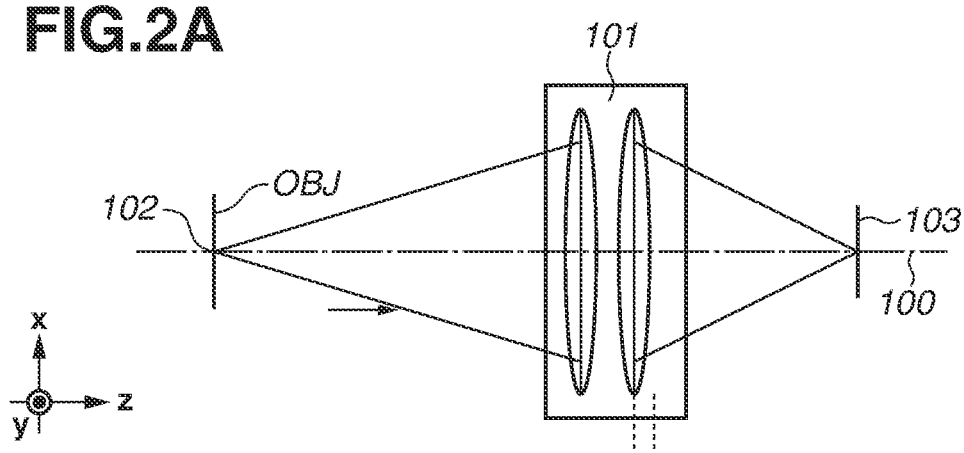
FIGS. 2A and 2B are diagrams each illustrating a distance measurement error caused by a temperature change.
Figure 2B:
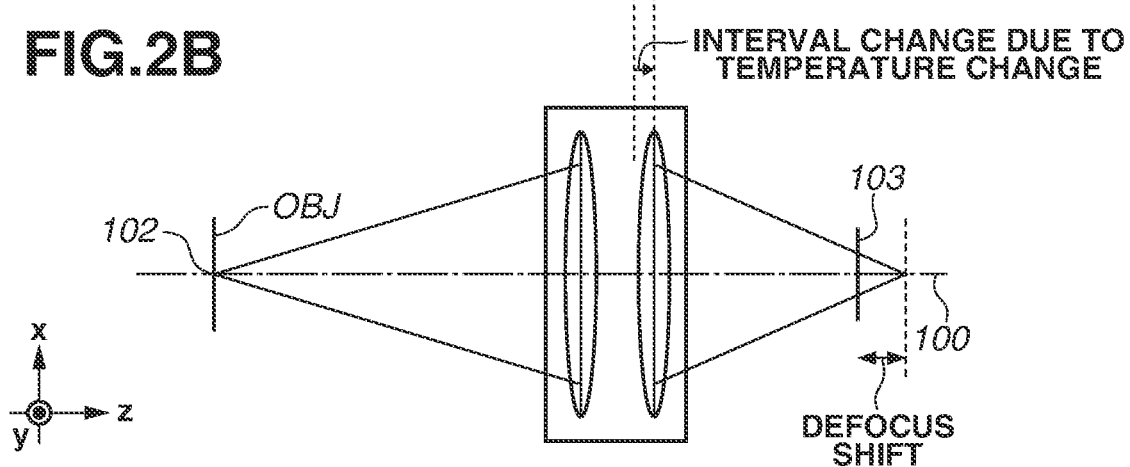

FIGS. 2A and 2B are diagrams schematically illustrating a temperature focus shift of an imaging optical system 101. As illustrated in FIG. 2A, light output from an object point 102 present on the optical axis 100 is ideally focused on one point on an optical device 103 by the imaging optical system 101.

However, in a case where a temperature change occurs in the imaging optical system 101, an optical arrangement changes due to extensions of a lens barrel and a flange back and changes of a glass thickness, a lens interval, a lens refractive index, and a lens curvature. Due to this optical arrangement change, as illustrated in FIG. 2B, the focus position of the light output from the object point 102 shifts from the optical device 103, and a defocus shift is caused.

In normal imaging apparatuses, the defocus shift is corrected by driving the focus lens to reduce the deterioration of the captured image. However, in a case where the focus lens is driven to correct the defocus shift when the distance measurement is performed, the object distance S in the above-described equation (1) changes to cause the distance measurement error. Accordingly, the defocus shift needs to be corrected without driving the focus lens.

<Relationship Between Position of Thermometer and Temperature of Optical System>

Figure 3:
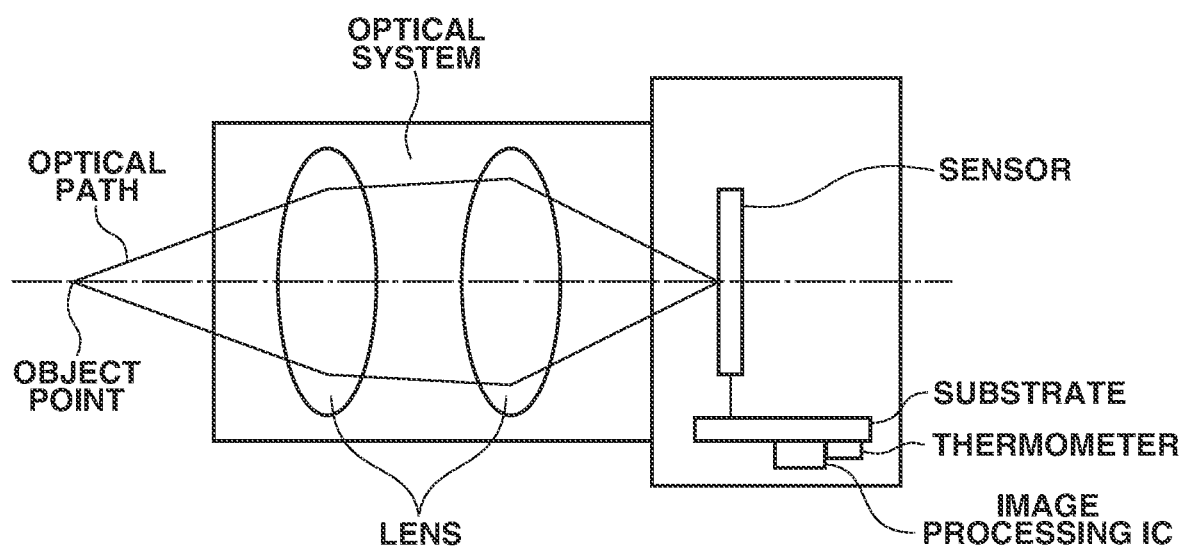
FIG. 3 is a diagram illustrating an example of a positional relationship between a thermometer and an optical system.

FIG. 3 is a diagram illustrating an example of a positional relationship between a thermometer and an optical system.

In digital cameras, a main heat source other than the environmental temperature is an image processing integrated circuit (IC) on a substrate for performing image processing using a signal obtained from a sensor (image sensor). Recently, the number of pixels of a captured image has increased, and a load in complicated image processing has been increasing. For this reason, to prevent overheat of the digital camera, in many cases, the digital camera is provided with a thermometer near the image processing IC to have a function of monitoring a substrate temperature so that the substrate temperature does not exceed a predetermined temperature.

A relationship between a temperature indicated by a thermometer disposed near the image processing IC and a temperature change of the optical system when the image capturing is performed continuously will be described with reference to FIG. 4A. Hereinbelow, a description will be given on the assumption that the temperature of the optical system is proportional to the defocus amount.

Figure 4A:
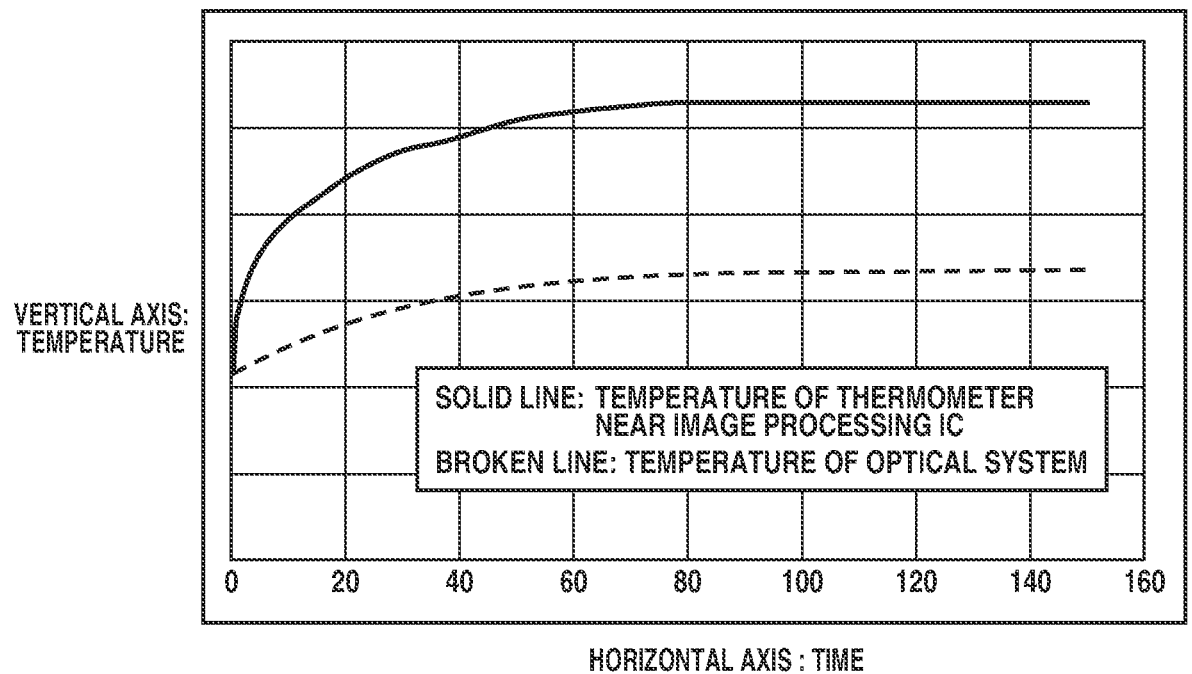
FIGS. 4A and 4B are graphs illustrating an example of a relationship between a temperature change of the thermometer and a temperature change of the optical system and an example of a relationship between temperature changes of the thermometer under different environmental temperatures, respectively.

The horizontal axis in FIG. 4A indicates a driving time period of the image sensor, and the vertical axis indicates a temperature. A solid line indicates the temperature obtained from the thermometer disposed near the image processing IC, and a broken line indicates the temperature of the optical system. The zero position of the horizontal axis is a temperature at an image capturing start time, i.e., an environmental temperature. As illustrated in FIG. 4A, in particular, immediately after the image capturing start time, the inclination of the temperature rise near the image processing IC with respect to the driving time period of the image sensor is rapidly changing, but the temperature of the optical system is relatively slowly changing.

As the reason for the above, a time difference occurs because the digital camera body and the lens barrel of the optical system release heat while the temperature rise near the image processing IC caused by the continuous image capturing is transmitted to the optical system. If there is no time difference, it is possible to simply correct the defocus amount based on the temperature near the image processing IC. However, there remains an issue in correcting the measurement distance because of the occurrence of the time difference. The above-described issue will be described with reference to FIG. 4B.

Figure 4B:
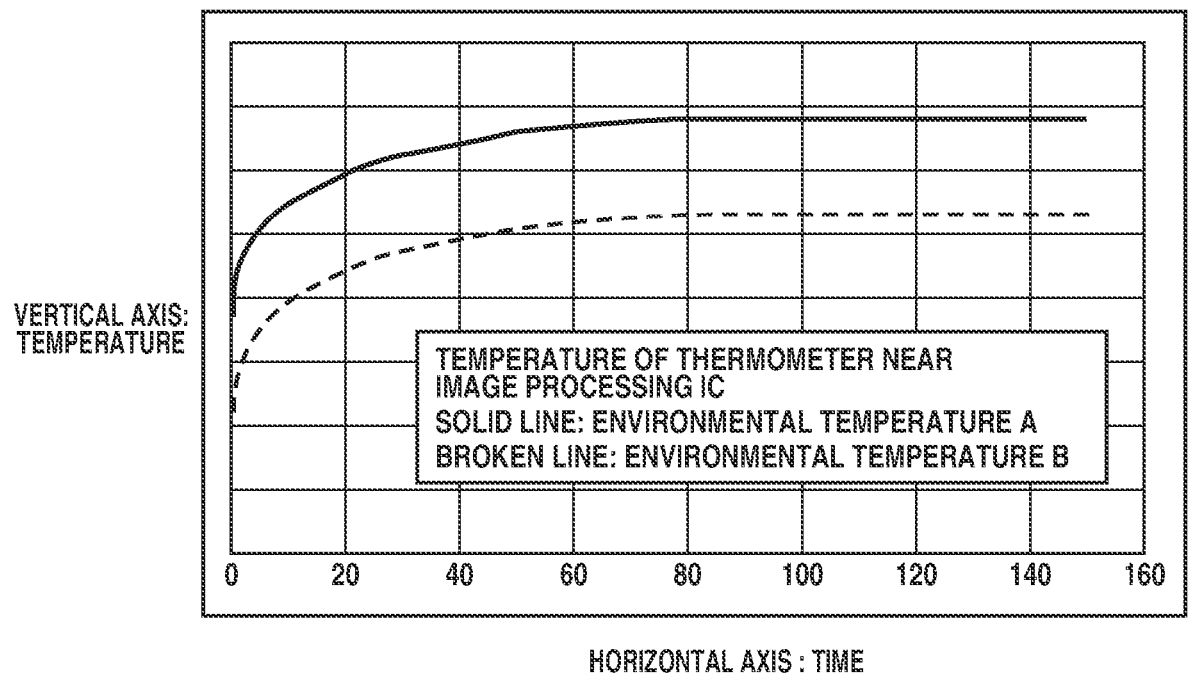

FIG. 4B illustrates examples in which environmental temperatures are different around the thermometer disposed near the image processing IC.

Like in FIG. 4A, the horizontal axis in FIG. 4B indicates the driving time period of the image sensor, and the vertical axis in FIG. 4B indicates the temperature. A solid line indicates a case where the temperature is an environmental temperature A, and a broken line indicates a case where the temperature is an environmental temperature B. When the thermometer disposed near the image processing IC indicates the same value in each case, the driving time period of the image sensor can take two values depending on the environmental temperature. When the driving time period of the image sensor is different, the temperature of the optical system cannot be appropriately estimated. As a result, the defocus amount may not be accurately corrected, and the defocus shift may occur. This defocus shift causes the error in the distance measurement, and is an issue when the temperature correction of the distance information is performed. This is also the issue that may be generated in a case where the temperature of the optical system and the defocus amount have a relative relationship other than the proportional relationship therebetween. A solution for the above-described issue will be described below.

<Temperature Correction Method of Distance Information>

In the present disclosure, to solve the issue occurring when the temperature correction of the distance information is performed, a temperature of the optical system at a time of image capturing of a distance measurement image is estimated using temperature information and time information near the image capturing time of the distance measurement image. In this way, highly accurate object distance correction can be performed.

Figure 5A:
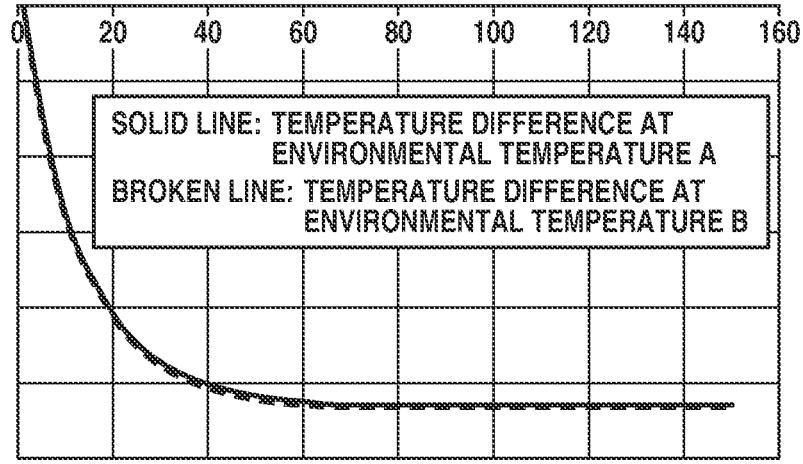
FIGS. 5A and 5B are graphs illustrating an example of a temperature difference between the thermometer and the optical system and an example of a differential value of the temperature respectively.

FIG. 5A is a graph illustrating a difference between the temperature of the optical system and the temperature of the thermometer disposed near the image processing IC. The horizontal axis in FIG. 5A indicates the driving time period of the image sensor, and the vertical axis in FIG. 5A indicates the temperature difference. A solid line indicates a case where the temperature is an environmental temperature A, and a broken line indicates a case where the temperature is an environmental temperature B. As illustrated in FIG. 5A, the relationship obtained by subtracting the temperature of the thermometer from the temperature of the optical system is determined based on the heat release of the optical system and the heat generation and the heat release of the imaging system, not depending on the environmental temperature. Thus, it is understood that if the driving time period of the image sensor from the imaging start time can be estimated, the temperature difference can be estimated.

Figure 5B:
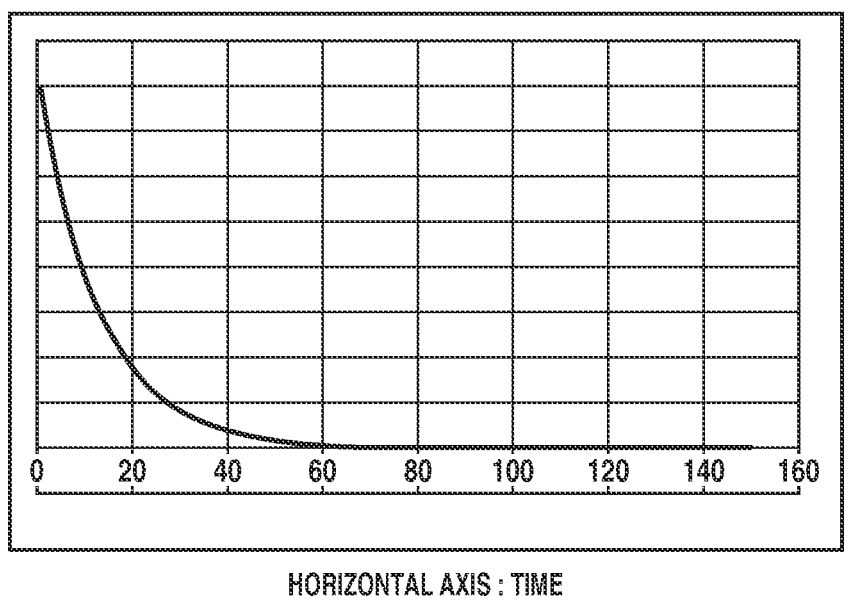

FIG. 5B is a graph obtained by differentiating the temperature of the thermometer disposed near the image processing IC in the time direction. The horizontal axis in FIG. 5B indicates the driving time period of the image sensor, and the vertical axis in FIG. 5B indicates the differential value of the temperature obtained from the thermometer disposed near the image processing IC. As illustrated in FIG. 5B, the differential value is largest immediately after the image capturing start time, and is decreasing with time, i.e., monotonic decreasing function. After sufficient time has elapsed, i.e., in a stationary state, the differential value becomes zero.

Because the differential value is a function of decreasing monotonically, the differential value and the elapsed time has a relationship of one to one. Accordingly, the driving time period of the image sensor can be estimated by evaluating the differential value based on a plurality of pieces of temperature information about a plurality of thermometers disposed near the image processing IC and the time information.

It is possible to estimate the driving time period information about the image sensor in the distance measurement image, based on the relationship illustrating in FIG. 5B, the temperature information at the time of capturing the distance measurement image, and the temperature information and the time information at a time near the image capturing time of the distance measurement image. The temperature information about the optical system can be estimated from the relationship illustrated in FIG. 5A by estimating the information about the driving time period of the image sensor. As described above, because the temperature of the optical system has a proportional relationship with the defocus amount, a highly accurate object distance correction can be performed.

Configuration Example of Distance Measurement Apparatus

FIG. 6 is a block diagram illustrating an example of a functional configuration of the distance measurement apparatus according to the present disclosure. Herein, a digital camera 110 is used as an example of the distance measurement apparatus.

An imaging optical system 10 is an imaging lens provided in the digital camera 110 to form an optical image of an object on an image sensor 11. The imaging optical system 10 is composed of a plurality of lenses 112 arranged on the optical axis 100, and includes an exit pupil 111 at a position separate from the image sensor 11 by a predetermined distance.

The image sensor 11 is, for example, a charge-coupled device (CCD) sensor or a complementary metal-oxide semiconductor (CMOS) sensor. The image sensor 11 photoelectrically converts an object image formed on an imaging plane via the imaging optical system 10, and outputs an image signal related to the object image.

A control unit 12 is a control unit such as a central processing unit (CPU) and a microprocessor, and controls the operation of each block included in the digital camera 110. The control unit 12 controls, for example, an automatic focusing (AF) at an image capturing time, a focus position (in-focus position) change, an F value (aperture) change, an image import, a storage unit 15, an input unit 16, a display unit 17, and a communication unit 18.

The measurement unit 13 calculates a distance to a focused object. As illustrated in FIG. 6, the measurement unit 13 includes a lens driving information obtaining unit 130, a temperature information obtaining unit 131, a correction information obtaining unit 132, and a correction unit 133. Functions of the units included in the measurement unit 13 will be described below.

An image processing unit 14 is a block that implements the various kinds of image processing performed in the digital camera 110. The image processing unit 14 performs various kinds of signal processing such as a noise reduction, a demosicing, a luminance signal conversion, an aberration correction, a white balance adjustment, and a color correction, on the image signal output from the image sensor 11. The image data (captured image) output from the image processing unit 14 is stored in a memory (not illustrated), and used by the display unit 17. The output image data is stored in the storage unit 15. The image processing unit 14 can be formed of a logical circuit. In another form, the image processing unit 14 may be formed of a CPU and a memory storing an arithmetic processing program.

The storage unit 15 is a nonvolatile storage medium storing captured image data, intermediate data generated in the operation process of each block, and parameters to be referred to in the operation of the image processing unit 14 and the digital camera 110. The storage unit 15 may be any recording medium as long as it is readable and writable at high speed, and has a large capacity, if a tolerable processing capability is secured for performing the processing, and, for example, a flash memory or the like is desirable.

The input unit 16 is a user interface for detecting an information input or a setting change operation input to the digital camera 110 via, for example, a dial, a button, a switch, and a touch panel. The input unit 16 outputs, upon detecting an operation input, a corresponding control signal to the control unit 12.

The display unit 17 is a display apparatus, such as a liquid crystal display or an organic electroluminescence (EL) display. The display unit 17 is used for a composition check by displaying an image to be captured when the image is captured, for various setting screens, and for a notification of message information. The display function and the input function can be simultaneously implemented by using the touch panel.

The communication unit 18 is a communication interface included in the digital camera 110 and for implementing information exchange with an external apparatus. The communication unit 18 may be configured to be capable of transmitting the obtained captured image or the image capturing information to other apparatuses.

A sensor 19 is a sensor (sensors) for monitoring a state of the digital camera 110, and examples of the sensor include an acceleration sensor, a gyro sensor, or a temperature sensor, as a representative sensor.

Configuration Example of Image Sensor

Details of the configuration example of the above-described image sensor 11 will be described with reference to FIGS. 7A and 7B.

Figure 7A:
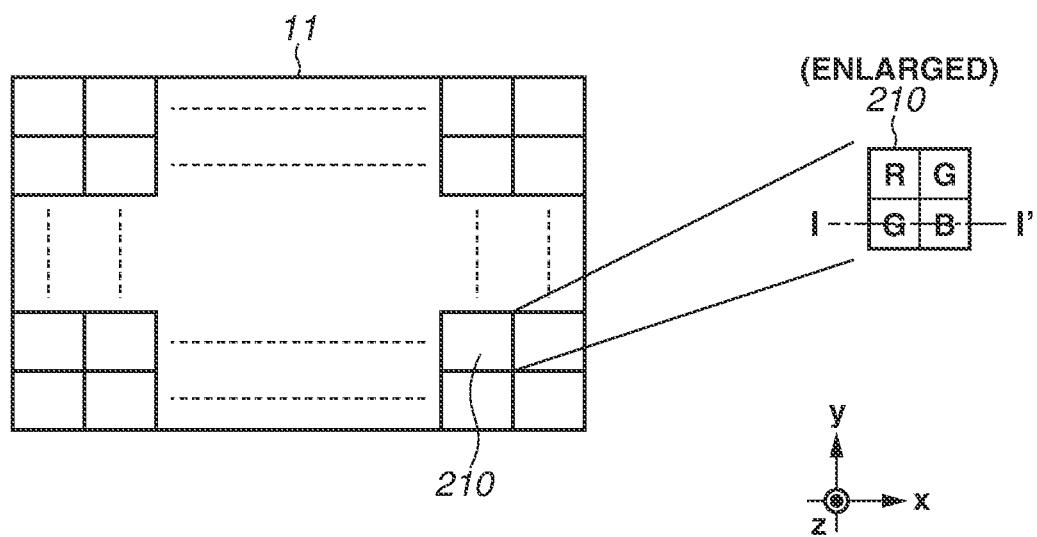
FIGS. 7A and 7B are diagrams illustrating an image sensor of the digital camera.
Figure 7B:
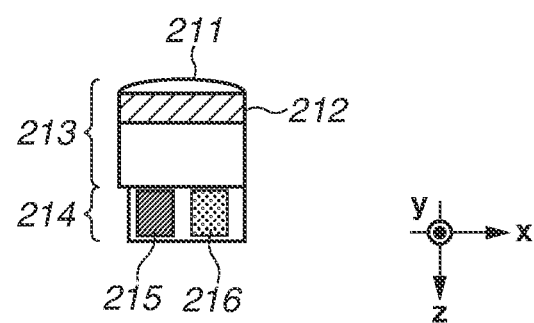

As illustrated in FIG. 7A, the image sensor 11 is formed by connecting and arranging a plurality of 2-by-2 pixel groups 210, and a different color filter is applied to each pixel in the pixel group 210. As illustrated in an enlarged view, Red (R), Green (G), and Blue (B) color filters are arranged in the pixel group 210, and one of color signals each representing color information of R, G, or B is output from each pixel (photoelectric conversion element). In the present exemplary embodiment, as an example, a description will be given on the assumption that the color filters are arranged as illustrated in FIG. 7A, but the present disclosure is not limited to the exemplary embodiments.

In order to achieve the distance measurement function by the imaging plane phase difference distance measurement method, a pixel (photoelectric conversion element) is formed of a plurality of photoelectric conversion units arranged in a horizontal direction of the image sensor 11 in an I-I' cross section in FIG. 7A. More specifically, as illustrated in FIG. 7B, each pixel includes a light-guiding layer 213 and a light-receiving layer 214. The light-guiding layer 213 includes a microlens 211 and a color filter 212, and the light-receiving layer 214 includes a first photoelectric conversion unit 215 and a second photoelectric conversion unit 216.

In the light-guiding layer 213, the microlens 211 is configured to efficiently guide the light flux incident on the pixel to the first photoelectric conversion unit 215 and the second photoelectric conversion unit 216. The color filter 212 is a filter through which light in a predetermined wavelength band passes and through which light in one of above-described R, G, and B wavelength bands passes, and the color filter 212 guides the light to the first photoelectric conversion unit 215 and the second photoelectric conversion unit 216 in the subsequent stage.

In the light-receiving layer 214, two photoelectric conversion units (first photoelectric conversion unit 215 and second photoelectric conversion unit 216) each for converting the received light into an analog image signal are provided, and the two types of signals output from these two photoelectric conversion units are used for the distance measurement. More specifically, each pixel in the image sensor 11 includes two photoelectric conversion units arranged in the horizontal direction, and an image signal composed of the signal output from the first photoelectric conversion unit 215 and an image signal composed of the signal output from the second photoelectric conversion unit 216, among all the pixels, are used for the distance measurement. In other words, each of the first photoelectric conversion unit 215 and the second photoelectric conversion unit 216 partially receives the light flux incident on the pixel via the microlens 211. Thus, two types of the image signals finally obtained are a pupil-divided image group corresponding to light fluxes that have passed through the different areas of the exit pupil of the imaging optical system 10. In the present exemplary embodiment, the signal obtained by combining the image signals photoelectrically converted by the first photoelectric conversion unit 215 and the image signal photoelectrically converted by the second photoelectric conversion unit 216 is equivalent to an image signal (for viewing) output from one photoelectric conversion unit in a configuration in which one pixel only includes the one photoelectric conversion unit.

With the above-described configuration, the image sensor 11 according to the present exemplary embodiment can output an image signal for viewing and an image signal for distance measurement, i.e., two types of pupil-divided images.

In the present exemplary embodiment, a description will be given on the assumption that each pixel in the image sensor 11 includes two photoelectric conversion units, but the exemplary embodiments of the present disclosure are not limited thereto. For example, the configuration illustrated in FIG. 7B may also be arranged in a vertical direction in addition to the horizontal direction. In other words, a pixel may include four photoelectric conversion units, and may be formed in such a manner that the pupil division in the vertical direction becomes possible in addition to the horizontal direction. By dividing a pixel into four, a distance can be detected for an object in the horizontal and vertical directions, and thus, it is possible to perform a more highly accurate distance measurement.

<Distance Measurement Principle of Imaging Plane Phase Difference Distance Measurement Method>

The principle of deriving an object distance based on the above-described pupil-divided image group will be described with reference to FIGS. 8A to 8E.

Figure 8A:
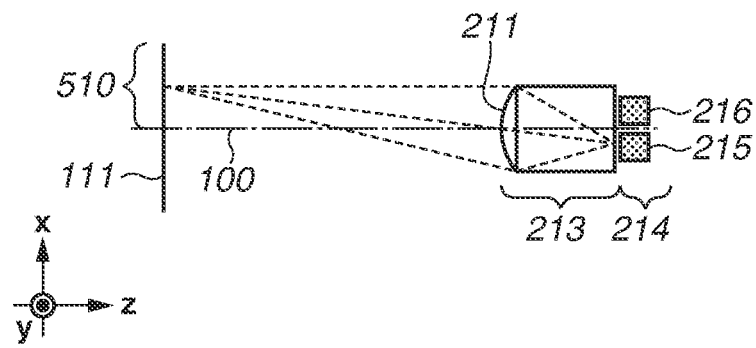
FIGS. 8A to 8E are diagrams illustrating a distance measurement principle of an imaging plane phase difference distance measurement method.

FIG. 8A is a diagram schematically illustrating the exit pupil 111 of the imaging optical system 10, and a light flux received by the first photoelectric conversion unit 215 of a pixel in the image sensor 11. Similarly, FIG. 8B is a diagram schematically illustrating a light flux received by the second photoelectric conversion unit 216.

Figure 8B:
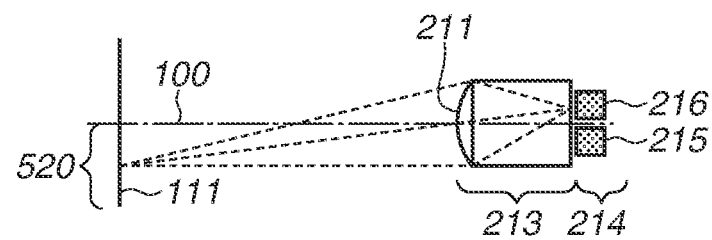

The microlens 211 illustrated in each of FIGS. 8A and 8B is arranged so that the exit pupil 111 and the light-receiving layer 214 have a conjugate relationship. The light flux that has passed through the exit pupil 111 of the imaging optical system 10 is condensed by the microlens 211 and guided to the first photoelectric conversion unit 215 or the second photoelectric conversion unit 216. At this time, as illustrated in FIGS. 8A and 8B, each of the first photoelectric conversion unit 215 and the second photoelectric conversion unit 216 mainly receives a light flux that has passed through a different pupil region. The first photoelectric conversion unit 215 receives the light flux that has passed through the first pupil region 510, and the second photoelectric conversion unit 216 receives the light flux that has passed through the second pupil region 520.

Each of a plurality of the first photoelectric conversion units 215 included in the image sensor 11 mainly receives the light flux that has passed through the first pupil region 510 and outputs a first image signal. At the same time, each of a plurality of the second photoelectric conversion units 216 included in the image sensor 11 mainly receives the light flux that has passed through the second pupil region 520 and outputs a second image signal. An intensity distribution of an image formed on the image sensor 11 by the light fluxes that have passed through the first pupil region 510 can be obtained from the first image signals. An intensity distribution of an image formed on the image sensor 11 by the light fluxes that have passed through the second pupil region 520 can be obtained from the second image signals.

Figure 8C:
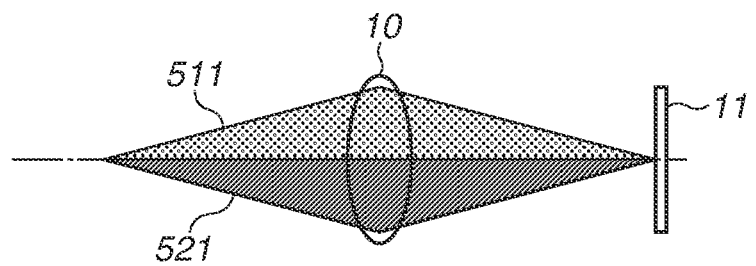
Figure 8D:
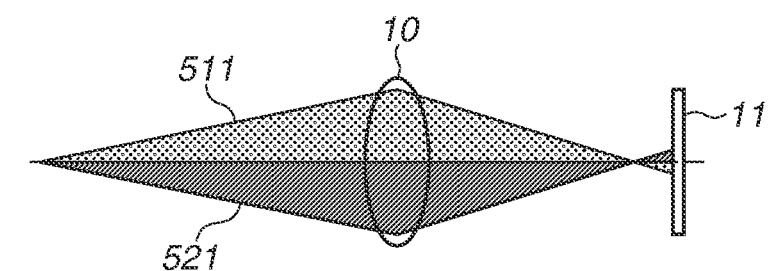
Figure 8E:
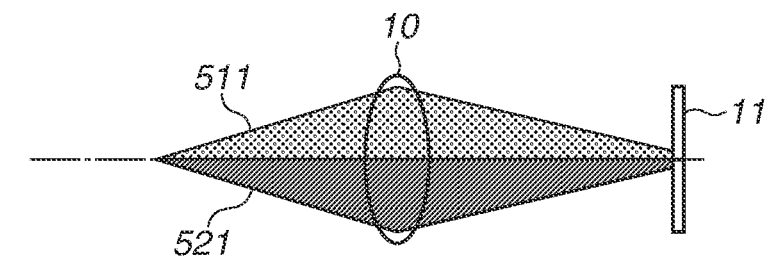

A relative positional displacement amount (i.e., parallax amount) between the first image signal and the second image signal becomes a value corresponding to a defocus amount. The relationship between the parallax amount and the defocus amount will be described with reference to FIGS. 8C, 8D, and 8E. FIGS. 8C, 8D, and 8E are diagrams each schematically illustrating the image sensor 11 and the imaging optical system 10. A first light flux 511 is a light flux passing through the first pupil region 510, and a second light flux 521 is a light flux passing through the second pupil region 520.

FIG. 8C illustrates an in-focus state, and the first light flux 511 and the second light flux 521 are converged on the image sensor 11. At this time, the parallax amount becomes zero between the first image signal generated by the first light flux 511 and the second image signal generated by the second light flux 521. FIG. 8D illustrates a defocus state in a negative direction of the Z axis on the image side. At this time, the parallax amount does not become zero but has a negative value between the first image signal generated by the first light flux 511 and the second image signal generated by the second light flux 521. FIG. 8E illustrates a defocus state in a positive direction of the Z axis on the image side. At this time, the parallax amount has a positive value between the first image signal generated by the first light flux 511 and the second image signal generated by the second light flux 521. From the comparison between FIGS. 8D and 8E, it is understood that the direction of the positional displacement is switched depending on the positive or negative of the defocus amount. The positional displacement is caused corresponding to the defocus amount based on an image formation relationship (geometric relationship) of the imaging optical system 10. The parallax amount, which is the positional displacement amount between the first image signal and the second image signal, can be detected using a region-based matching approach to be described below.

<Defocus Image Generation Processing>

Figure 9:
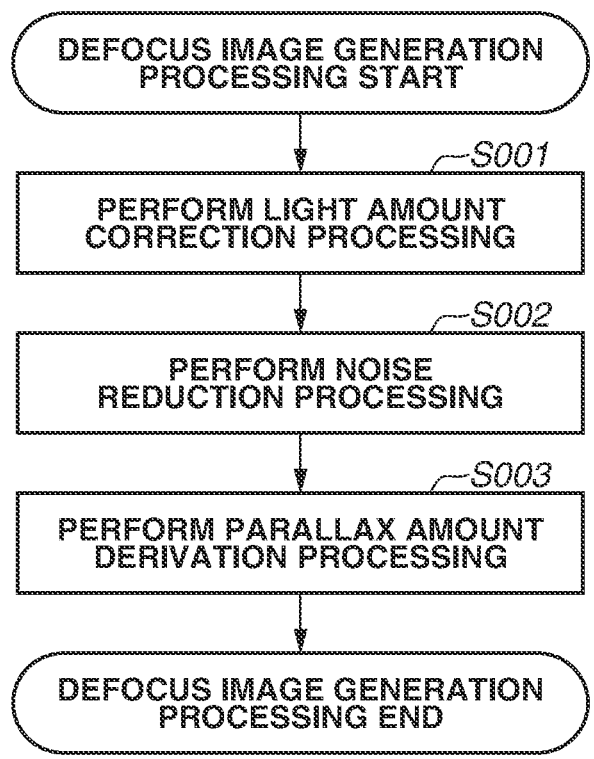
FIG. 9 is an example of a flowchart illustrating processing performed by the digital camera.

The image processing unit 14 generates a defocus image (defocus distribution information) from the obtained two kinds of image signals. A defocus generation unit in the image processing unit 14 performs processing related to the generation of the defocus image. Now, the processing related to the generation of the defocus image will be described with reference to a flowchart in FIG. 9.

In step S001, the defocus generation unit performs light amount correction processing on an image signal S1 and an image signal S2. The light amount balance between the image signal S1 and the image signal S2 is lost due to the difference in shape between the first pupil region 510 and the second pupil region 520 caused by the vignetting at a marginal angle of the imaging optical system 10. For this reason, in step S001, the defocus generation unit 141 performs the light amount correction of the image signal S1 and the image signal S2 using, for example, a light amount correction value stored in a memory (not illustrated) in advance.

In step S002, the defocus generation unit performs noise reduction processing of reducing noise generated at the time of conversion in the image sensor 11. More specifically, the defocus generation unit reduces the noise by applying filter processing to the image signal S1 and the image signal S2. In general, a signal-to-noise (SN) ratio becomes lower in a higher spatial frequency range, and the noise component relatively increases. Accordingly, the defocus generation unit performs processing of applying a low-pass filter for reducing the passage rate more as the spatial frequency is higher. The light amount correction performed in step S001 may not bring a preferable result depending on the manufacturing error of the imaging optical system 10, and for this reason, the defocus generation unit may desirably apply a band-pass filter that blocks the direct current (DC) component and has a low passage rate for the higher frequency components.

In step S003, the defocus generation unit performs parallax amount derivation processing of deriving the parallax amount between the images based on the image signal S1 and the image signal S2. More specifically, the defocus generation unit sets a point of interest corresponding to representative pixel information and a collation region around the point of interest in the image signal S1. The collation region may be, for example, a rectangular region such as a square region having a predetermined length on each side around the point of interest. The defocus generation unit sets a reference point in the image signal S2 and sets a reference region around the reference point. The reference region has the same size and shape as those of the above-described collation region. The defocus generation unit derives a correlation degree between the image included in the collation region of the image signal S1 and the image included in the reference region of the image signal S2, while sequentially moving the reference point. The reference point with the highest correlation degree among the derived correlation degrees is specified as a corresponding point that corresponds to the point of interest in the image signal S2. The relative positional displacement amount between the corresponding point specified in this way and the point of interest is determined as a parallax amount at the point of interest.

The defocus generation unit derives parallax amounts at a plurality of pixel positions determined by the representative pixel information by calculating the parallax amounts while sequentially changing the point of interest according to the representative pixel information. In the present exemplary embodiment, for the sake of simplicity, it is assumed that the number of pixel positions (pixel group included in the representative pixel information) to be used to calculate the parallax amounts is set to have the same number of pixels as that in the image for viewing so that the defocus information with the same resolution as that of the image for viewing can be obtained. Normalized Cross-Correlation (NCC), Sum of Squared Difference (SSD), or Sum of Absolute Difference (SAD) can be used as the derivation method of the correlation degree.

The derived parallax amount "d" can be converted into the defocus amount, which is a distance from the image sensor 11 to the focal point of the imaging optical system 10, by using a predetermined conversion coefficient. The parallax amount "d" can be converted into the defocus amount, using the following equation.

$$\Delta L = K \times d$$

where K is the predetermined coefficient, and ΔL is the defocus amount.

The defocus generation unit generates two-dimensional information including the defocus amounts derived in this way as pixel values and stores the two-dimensional information in a memory (not illustrated) as a defocus image. The defocus image obtained in this way is used for the object distance measurement as a defocus amount map. In the present exemplary embodiment, an example in which the defocus image is mainly generated, output, and stored is described. The defocus image may be generated, output, and stored in a form of parallax amount distribution information indicating the phase differences, or a form of object distance distribution information (object distance image) obtained by further converting the defocus amounts into the object distances based on the lens state of the imaging optical system. Hereinbelow, the parallax amount distribution, the defocus image, and the object distance image are collectively referred to as distance information.

Figure 10:
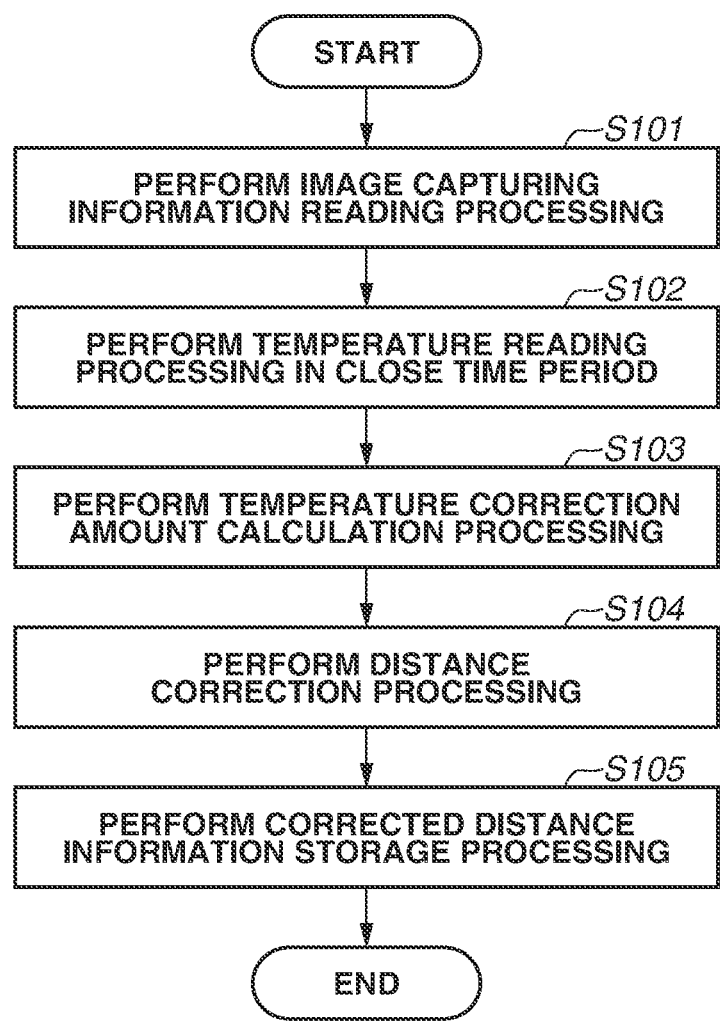
FIG. 10 is an example of a flowchart illustrating processing according to one or more aspects of the present disclosure.

With reference to FIG. 10, a basic processing flow of the distance measurement apparatus according to a first exemplary embodiment of the present disclosure will be described.

FIG. 10 is a flowchart according to the present exemplary embodiment, and each step of the measurement unit 13 is executed based on instructions from the control unit 12 in FIG. 6.

In image capturing information reading processing performed in step S101, the measurement unit 13 obtains data about the image (distance measurement image) stored in the storage unit 15. The lens driving information obtaining unit 130 reads parameters, such as a focal length, a focus position, an aperture value, and an imaging magnification, stored in a memory area such as the storage unit 15 in the digital camera 110, as additional information to the distance measurement image. The temperature information obtaining unit 131 reads the temperature information near the image processing IC, and the time information of the distance measurement image at the image capturing time. The parameters are stored in the storage unit 15 to be used when the defocus amount is converted into the object distance in post-processing. In a case where there is no temperature information or no time information, the correction processing is ended because the temperature correction of the distance is not to be performed.

In temperature reading processing at a close time performed in step S102, the correction information obtaining unit 132 reads the temperature information near the image processing IC in the time period close to the time of capturing the distance measurement image (close time). This reading processing may be performed by the temperature information obtaining unit 131. In this case, if the temperature information in the close time period cannot be obtained, the correction unit 133 does not perform a time correction of the temperature to be described below.

In temperature reading processing performed in step S102, the temperature information about an imaging file in a close time period may be read, or the temperature information in a close time period of capturing the distance measurement image may be stored in the storage unit 15 or other memories at the time of capturing the distance measurement image and the stored temperature information may be read.

In temperature correction amount calculation processing performed in step S103, the correction unit 133 calculates a temperature correction amount using a temperature coefficient table stored in the storage unit 15 in the digital camera 110, with the temperature of the distance measurement image and the imaging file of the close time period being considered as inputs. The temperature coefficient table may be stored in the lens barrel side, and may be transmitted to the digital camera 110 at a communication time. For example, the temperature coefficient table may be stored on the cloud, downloaded via a network when the temperature correction of the distance measurement image is performed, and used to correct the distance measurement image.

In distance correction processing performed in step S104, the correction unit 133 corrects the distance using the temperature that is corrected based on the time. The correction unit 133 corrects the distance using a distance coefficient table stored in the storage unit 15 of the digital camera 110. In step S104, similar to step S103, the distance coefficient table may be stored in the lens barrel side or stored on the cloud. More specifically, the communication unit 18 may communicate with an external network based on an instruction from the control unit 12, obtain the distance coefficient table stored on the cloud, and provide the obtained distance coefficient table to the correction unit 133. The correction unit 133 obtains a distance correction value based on the corrected temperature information and corrects the distance data in the distance measurement image by adding the obtained distance correction value to the distance value obtained by the method described above. As a result of the distance correction processing in step S104, the correction unit 133 can calculate the distance information with the temperature correction appropriately performed thereon.

In step S105, the control unit 12 performs storage processing of storing the distance information calculated in step S104, in the storage unit 15.

As described above, according to the present exemplary embodiment, even in the case where the temperature change occurs depending on the image capturing condition, it is possible to provide a technique that can accurately calculate the object distance.

In step S104, the description is given of the correction method of obtaining the distance correction value and correcting the distance data using the obtained distance correction value as the distance correction method, but the present disclosure is not limited to the method. For example, the distance may be corrected by obtaining the correction value of the image side defocus amount to correct the distance. Alternatively, the distance may be corrected by obtaining the above-described correction value for the focus length or the conversion coefficient K to correct the distance. It is possible to accurately calculate the object distance based on the similar principle described above by these methods.

Figure 11:
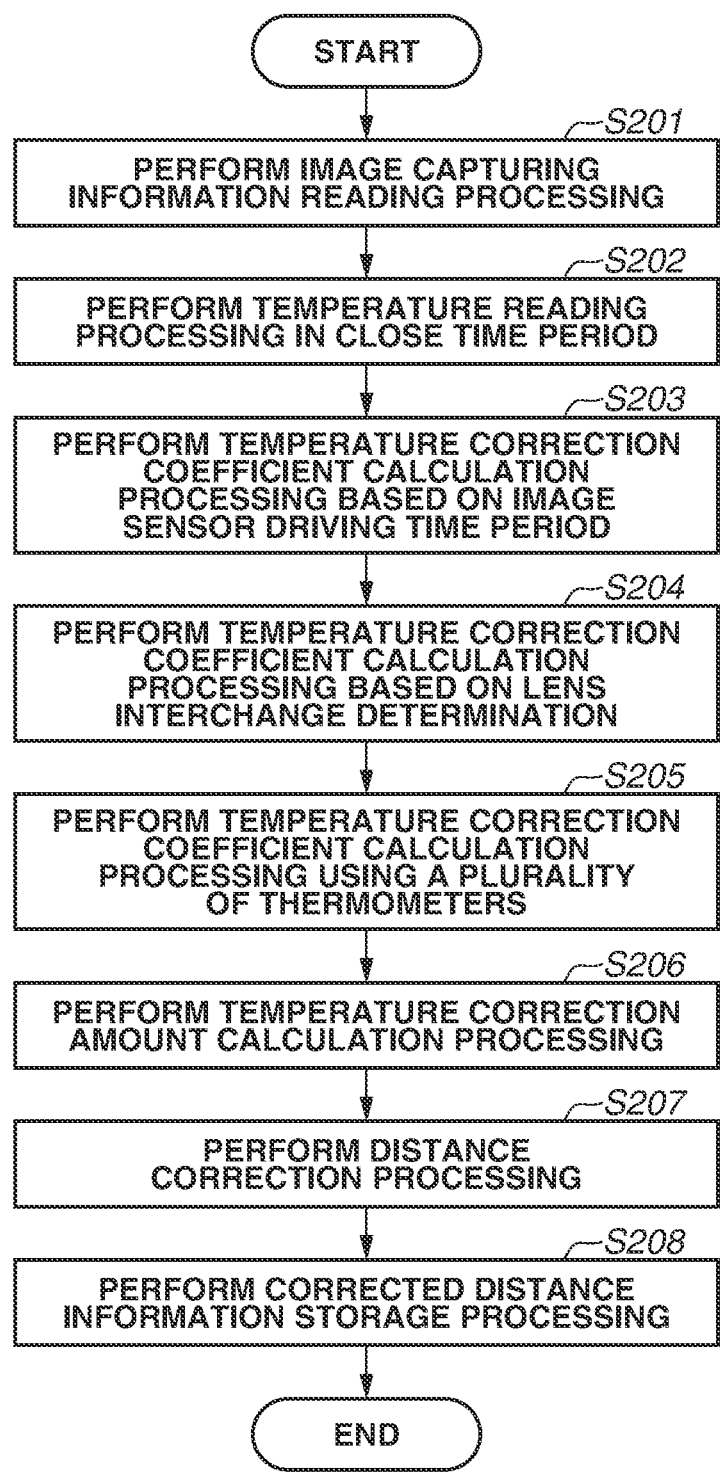
FIG. 11 is a flowchart illustrating an example of a flowchart according to one or more aspects of the present disclosure.

With reference to FIG. 11, a processing flow of the distance measurement apparatus according to a second exemplary embodiment of the present disclosure will be described.

FIG. 11 is a flowchart according to the second exemplary embodiment of the present disclosure, and similar to the first exemplary embodiment, the flowchart is implemented by the measurement unit 13 illustrated in FIG. 6. In this flowchart also, the units in the measurement unit 13 execute the steps based on the instructions from the control unit 12.

The flowchart according to the second exemplary embodiment is different from the flowchart according to the first exemplary embodiment in that lens interchange determination processing, image sensor driving time period calculation processing, correction processing of a plurality of thermometers are added to the processing performed in the first exemplary embodiment.

The processing performed in steps S201 and S202 is the same as that performed in steps S101 and S102 in the first exemplary embodiment.

In step S203, the correction unit 133 performs temperature correction coefficient calculation processing based on the image sensor driving time period.

Because the image processing IC, which is a main heat generation source, is not operating while the image sensor 11 is not operating, the temperature change is caused by the heat release from the digital camera main body and the heat release from the lens barrel of the optical system. Accordingly, the temperature transition can be accurately estimated by storing the driving time period of the image sensor 11 in a log file in the digital camera 110. The log file is stored in the storage unit 15, and the correction unit 133 refers to the driving time period of the image sensor 11 stored in the log file when the correction unit 133 performs the calculation processing of the temperature correction coefficient.

The temperature transition may be estimated by comparing the interval of the image capturing time and the sleep time set in the digital camera 110 and assuming that only the heat release is performed during the sleep time, instead of storing the image sensor driving time period itself in the log file. The sleep time set in the digital camera 110 is a predetermined time period after which the digital camera 110 enters a sleep state if no operation is performed during the predetermined time period. The time period during which the image sensor 11 is not being driven can be estimated, with reference to the interval of the image capturing time, the sleep time, and the time when the power of the digital camera 110 is turned on, without recording the driving time period of the image sensor 11 in the log file. In this way, the temperature transition can be accurately estimated. The correction unit 133 obtains the interval of the image capturing times and the sleep time set in the digital camera 110 from the storage unit 15, and uses the interval and the sleep time for the calculation processing of the temperature correction coefficient.

In a state where the user is viewing the object through the view finder under the conditions described above, the user may not operate the digital camera 110 for a predetermined time period. In this case, the correction unit 133 checks, for example, a degree of similarity between the continuously captured images of the object, and if the degree of similarity is a threshold value or more, the correction unit 133 may determine that the digital camera 110 is not in a sleep state, i.e., the image sensor 11 is being driven.

This is because the correction unit 133 can estimate that the image sensor is being driven if the correction unit 133 can determine that the type of the object is not switched in a case where the image capturing is performed tracing the moving object.

In step S204, the correction unit 133 performs temperature correction coefficient calculation processing based on the lens interchange determination.

The distance measurement apparatus and the digital camera 110 including the distance measurement apparatus according to the present exemplary embodiment may be configured such that the lens that is the optical system can be interchanged. When the lens is interchanged while an image is being captured, it is estimated that the temperature of the lens barrel of the optical system has become the same temperature as the environmental temperature while the digital camera main body has heat.

At this time, because the heat of the digital camera 110 is transmitted to the lens barrel of the optical system with a time lag, the temperature correction coefficient needs to be changed. The temperature correction coefficient may be changed by storing a time (lens interchange information) immediately after the lens interchange in a log file in the digital camera 110 and correcting the heat transmission manner. The log file including the lens interchange information is stored in a storage area such as the storage unit 15 to be used when the correction unit 133 changes the temperature correction coefficient.

The temperature of the lens barrel of the optical system immediately after the lens interchange may be estimated from the environmental temperature. The environmental temperature (i.e., external temperature or ambient temperature of outside of the apparatus) may be obtained, for example, by the communication unit 18 communicating with an external network to obtain the temperature information at the image capturing place. More specifically, the positional information is obtained by providing a global positioning system (GPS) function in the communication unit 18, and the communication unit 18 communicates with the external network based on the obtained positional information to obtain the temperature information at the position. The obtained temperature information is stored in a storage area such as the storage unit 15 to be used when the correction unit 133 changes the temperature correction coefficient.

For example, the image processing unit 14 determines whether the image is captured under an artificial light or the sunlight from the color temperature of the image, and the image processing unit 14 estimates that the image is captured indoors if the image is captured under the artificial light, and that the image is captured outdoors if the image is captured under the sunlight. In this way, the image processing unit 14 may estimate the external temperature. The image processing unit 14 performs the determination using the color temperature, and the correction unit 133 refers to the determination result. The user may select either capturing the image indoors or outdoors, and may perform the selection via the input unit 16 or the display unit 17.

For example, the input unit 16 or the display unit 17 may include items for the user to set the external temperature information at an image capturing time, and the external temperature may be estimated. More specifically, the distance measurement apparatus or the digital camera 110 may be configured in such a manner that the user can input the external temperature information via the input unit 16 or the display unit 17.

In step S205, the correction unit 133 performs the temperature correction coefficient calculation processing using a plurality of thermometers.

The temperature correction coefficient may be corrected by accurately estimating the temperature of the lens barrel of the optical system while a plurality of thermometers is provided and the temperature at each position is used. In this case, the temperature information obtaining unit 131 or the correction information obtaining unit 132 obtains the temperature information from the plurality of thermometers (sensor 19). Then, the correction unit 133 corrects the temperature correction coefficient based on the obtained temperature information.

In step S206, the correction unit 133 performs the temperature correction amount calculation processing. Unlike the first exemplary embodiment, in step S206, the correction unit 133 can calculate more accurate temperature correction information by using the temperature correction coefficient corrected in steps S203 to S205.

Processing performed in steps S207 and S208 is the same as that performed in steps S104 and S105 in the first exemplary embodiment.

According to the second exemplary embodiment, even if there is a temperature change due to the image capturing situation, it is possible to provide a technique that can accurately calculate the object distance.

In the first and second exemplary embodiments, the calculation of the object distance has been described. The calculated object distance information can be converted into a map of two-dimensional distance information (distance image) by a map generation unit (not illustrated in FIG. 6). The generated distance image is stored in the storage unit 15 or other memories, and can be displayed on the display unit 17 in response to the user's instruction via the input unit 16. The distance image generated by the map generation unit (not illustrated) is preferably a map with which the user can easily recognize the difference of the distance information visually, when the map is displayed on the display unit 17. Thus, for example, color coding or shading may be performed on the map based on the distance. In this way, the user can confirm the distance image on which the accurately calculated object distance is reflected.

The present disclosure can be realized by processing of supplying a program for implementing one or more functions of the above-described exemplary embodiments to a system or an apparatus via a network or a storage medium and one or more processors in the system or the apparatus reading and executing the program. The present disclosure can also be realized by a circuit (e.g., application specific integrated circuits (ASIC)) that can implement one or more functions.

The exemplary embodiments of the present disclosure have been described above, but the present disclosure is not limited to the exemplary embodiments, and can be modified and changed in various manners within the scope of the present disclosure.

According to the present disclosure, even if there is a temperature change due to the image capturing situation, it is possible to provide a technique that can accurately calculate the object distance.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-198019, filed Dec. 6, 2021, which is hereby incorporated by reference herein in its entirety.

What is claimed is:

1. A distance measurement apparatus comprising:
one or more processors; and
a memory storing instructions which, when executed by the one or more processors, cause the distance measurement apparatus to function as:
a calculation unit configured to calculate distance information corresponding to an image captured by an imaging apparatus using an image sensor that captures an object image focused on the image sensor via an optical system;
wherein the calculation unit estimates a driving time period of the image sensor, and
a temperature information obtaining unit configured to obtain temperature information of the imaging apparatus at different times; and
a distance correction unit configured to correct the distance information using the driving time period;
wherein the distance correction unit corrects the distance information based on the temperature information at a time at which a first image capturing is performed and the temperature information at a time before the first image capturing is performed.

2. The distance measurement apparatus according to claim 1, further comprising a storage unit configured to store a sleep time, which is a time period after which the imaging apparatus enters a sleep state, in a storage area,
wherein the distance correction unit corrects the distance information using the sleep time.

3. The distance measurement apparatus according to claim 1,
wherein the optical system is interchangeable, and the obtaining unit obtains interchange information indicating that the optical system is interchanged, and
wherein the distance correction unit corrects the distance information using the interchange information.

4. The distance measurement apparatus according to claim 3, further comprising an external temperature obtaining unit configured to obtain external temperature information when the image is captured, and
wherein the distance correction unit corrects the distance information using the external temperature information.

5. The distance measurement apparatus according to claim 4, wherein the external temperature obtaining unit obtains the external temperature information through an external communication.

6. The distance measurement apparatus according to claim 4, further comprising an input unit configured to allow a user to input the external temperature information,
wherein the external temperature obtaining unit obtains the external temperature information input via the input unit.

7. The distance measurement apparatus according to claim 4, wherein the distance correction unit corrects the temperature information using a temperature correction coefficient calculated using the external temperature information, and corrects the distance information based on the corrected temperature information.

8. The distance measurement apparatus according to claim 1, wherein the calculation unit calculates the distance information based on a first image based on a light flux that has passed through a first pupil region of the optical system and a second image based on a light flux that has passed through a second pupil region of the optical system.

9. The distance measurement apparatus according to claim 1, further comprising a generation unit configured to generate a distance image using the distance information.

10. An imaging apparatus comprising the distance measurement apparatus according to claim 1.

11. A control method for a distance measurement apparatus, the control method comprising:
- calculating distance information corresponding to an image captured by an imaging apparatus using an image sensor that captures an object image focused on the image sensor via an optical system;
- wherein a driving time period of the image sensor is estimated, and
- obtaining temperature information of the imaging apparatus at different times; and
- correcting the distance information using the driving time period;
- wherein the distance information is corrected based on the temperature information at a time at which a first image capturing is performed and the temperature information at a time before the first image capturing is performed.

12. A non-transitory computer-readable storage medium storing a computer-executable program for causing a computer to execute the a control method for a distance measurement apparatus, the method comprising:
- calculating distance information corresponding to an image captured by an imaging apparatus using an image sensor that captures an object image focused on the image sensor via an optical system;
- wherein a driving time period of the image sensor is estimated, and
- obtaining temperature information of the imaging apparatus at different times; and
- correcting the distance information using the driving time periodion;
- wherein the distance information is corrected based on the temperature information at a time at which a first image capturing is performed and the temperature information at a time before the first image capturing is performed.

* * * * *